United States Patent [19]

Kubo

[11] 4,388,058

[45] Jun. 14, 1983

[54] MOLDING DEVICE FOR FORMING A LINER INSIDE OF A CLOSURE SHELL

[75] Inventor: Tateo Kubo, Hiratsukashi, Japan

[73] Assignee: Toyo Seikan Kaisha, Ltd., Tokyo, Japan

[21] Appl. No.: 246,641

[22] Filed: Mar. 23, 1981

[30] Foreign Application Priority Data

Mar. 21, 1980 [JP] Japan .................................. 55-34685

[51] Int. Cl.³ .......................... B29C 1/04; B29C 3/00; B29C 6/00
[52] U.S. Cl. ................................ 425/110; 425/129 R; 425/809
[58] Field of Search ................ 425/809, 110, 114, 127

[56] References Cited

U.S. PATENT DOCUMENTS

| | | | |
|---|---|---|---|
| 2,881,475 | 4/1959 | Wilckens | 425/809 |
| 3,366,723 | 1/1968 | Green | 425/809 |
| 3,674,393 | 7/1972 | Busi | 425/110 |
| 3,807,924 | 4/1974 | Mingotti | 425/809 |
| 3,827,843 | 8/1974 | Blouch | 425/127 |
| 4,274,822 | 6/1981 | Tamai et al. | 425/127 |

FOREIGN PATENT DOCUMENTS 1200984  8/1970  United Kingdom ................ 425/809

Primary Examiner—J. Howard Flint, Jr.
Attorney, Agent, or Firm—Pennie & Edmonds

[57] ABSTRACT

A molding device for forming a liner on the inside surface of the top panel of a closure shell. The device has a molding tool disposed above an anvil which is relatively movable towards and away from the tool by an elevator mechanism. The molding tool includes a center punch. An annular bushing is positioned externally of the center punch and is movable over a predetermined range with respect to the punch. Resilient means are provided for urging the bushing upwardly with respect to the punch and a lowering mechanism is included for moving the bushing downwardly against the force of the resilient means.

5 Claims, 6 Drawing Figures

MOLDING DEVICE FOR FORMING A LINER INSIDE OF A CLOSURE SHELL

FIELD OF THE INVENTION

This invention relates to a molding device for shaping a liner material on the inside of the top panel of a closure shell into a predetermined shape.

DESCRIPTION OF THE PRIOR ART

Container closures of the type comprising a top panel, a closure shell having a skirt extending downwardly from the peripheral edge of the top panel, and a liner of a plastic material such as a polyolefin or vinyl chloride resin disposed on the inside of the top panel of the shell are known. Such closures have heretofore gained widespread acceptance as container closures for sealing the open portions of containers such as bottles and cans and include crown caps, pilferage-proof caps, screw caps and easily openable container closures of various forms. Generally the liner in such closures is formed conveniently by supplying a heat-molten liner material to the inside of the top panel of a closure shell and molding it into a desired shape (see, for example, the specifications and drawings of Japanese Patent Publication No. 15447/61, Japanese Utility Model Publication No. 3515/72, Japanese Laid-Open Patent Publication Nos. 1101776/77 and 89583/78, and Japanese Patent Application No. 149937/78 now Japanese Laid-Open Patent Publication No. 77523/80, the last one having been filed by the present applicant).

A known conventional device for molding a liner material to the inside of a top panel of a closure shell into a desired shape comprises an anvil on which is placed an inverted closure shell having a liner material supplied to the inside of its top panel. A molding tool is disposed above the anvil, and an elevator mechanism is included for elevating or lowering either of the molding tool or the anvil relative to the other. A problem with this type of molding device, such as the type shown for example in the specification and drawings of Japanese Patent Publication No. 77523/80 heretofore referred to or in the specification and drawings of U.S. application Ser. No. 154,875, now U.S. Pat. No. 4,312,824, assigned to the same assignee as the present application, is that when a greater portion of the liner material on the inside surface of the top panel of a closure shell is annular and is positioned on the peripheral edge portion of the inside of the top panel, the liner material cannot always be accurately molded into a liner of the desired shape.

A molding tool used in a known molding device generally includes a main body, a center punch secured to the lower end portion of the main body, an annular bushing positioned externally of the center punch and an annular position setting sleeve positioned externally of the annular bushing. The annular bushing and the annular position setting sleeve are mounted for raising or lowering relative to the main body of the molding tool over a predetermined range. The annular bushing is resiliently urged downwardly by a relatively weak spring means disposed between it and the main body, while the annular position setting sleeve is resiliently urged downwardly by a relatively strong spring means interposed between it and the main body of the molding tool. In a normal state (that is, a state before the liner material is molded by insertion of the lower end of the molding tool into the closure shell), the lower end of the annular bushing is resiliently urged downwardly by the relatively weak spring means so as to project downwardly beyond the lower end of the center punch and the lower end of the annular position setting sleeve. Accordingly, when either the molding tool or the anvil is lowered or elevated toward one other so as to insert the molding tool into the closure shell and mold the liner material therein, the lower end of the annular bushing is received in the shell prior to the receipt of the lower end of the center punch and the lower end of the annular position setting sleeve. If a greater portion of the liner material in the closure shell exists annularly on the peripheral edge portion of the inside of the top panel, the lower end of the annular bushing will initially abut the liner material to be molded, thus tending to spread the liner material radially inwardly and outwardly of the inside of the top panel of the shell. If the radially inward and outward spreading, especially the radially outward spreading, of the liner material occurs before the lower end of the center punch and the lower end of the annular position setting sleeve of the molding tool are fully inserted into the closure shell, a portion of the liner material will extend below the lower end of the annular position setting sleeve which is undesirable since it will result in a liner of an undesired shape being formed. As described in the above-referred to Japanese Patent Application No. 149937/78, it is the peripheral edge portion of the inside of the top panel which corresponding to the opening end of a container to be sealed that essentially requires the presence of a liner. For this reason and also in order to minimize the required amount of the liner material, it is important that the liner material to be molded should be restrained at the peripheral edge portion of the inside of the top panel of the closure shell so that the material will not spread radially outwardly therefrom.

DISCLOSURE OF INVENTION

It is a primary object of this invention to provide a molding device which will accurately shape and form a liner even when a greater portion of the liner material is positioned annularly on the peripheral edge portion of the inside of the top panel of a closure shell.

I have found that the primary object of the invention can be achieved by using an annular bushing which is mounted for movement relative to the main body of a molding tool over a predetermined range and which is adapted to be urged upwardly by a resilient means and to be selectively lowered against the force of the resilient means by a lowering mechanism.

According to the present invention, there is provided a molding device for forming a liner on the inside surface of the top panel of a container closure shell where the device has an anvil adapted to support an inverted closure shell having a liner material on the inside surface of its top panel. A molding tool is disposed above the anvil and includes a main body, a center punch fixed to a lower end portion of the main body. The lower surface of the tool is positioned opposite to a central portion of the inside top panel surface of the shell on the anvil. An annular bushing is positioned externally of the center punch and an elevator mechanism is included for elevating or lowering either of the main body of the molding tool or the anvil relative to the other. The annular bushing is mounted for movement relative to the main body of the molding tool over a predetermined range. The molding device further includes resilient means for urging the annular bushing upwardly relative to the main body of the molding tool and a lowering mechanism for selectively lowering the annular bushing against the force of the resilient means.

BEST MODE FOR CARRYING OUT THE INVENTION

Figure 1:
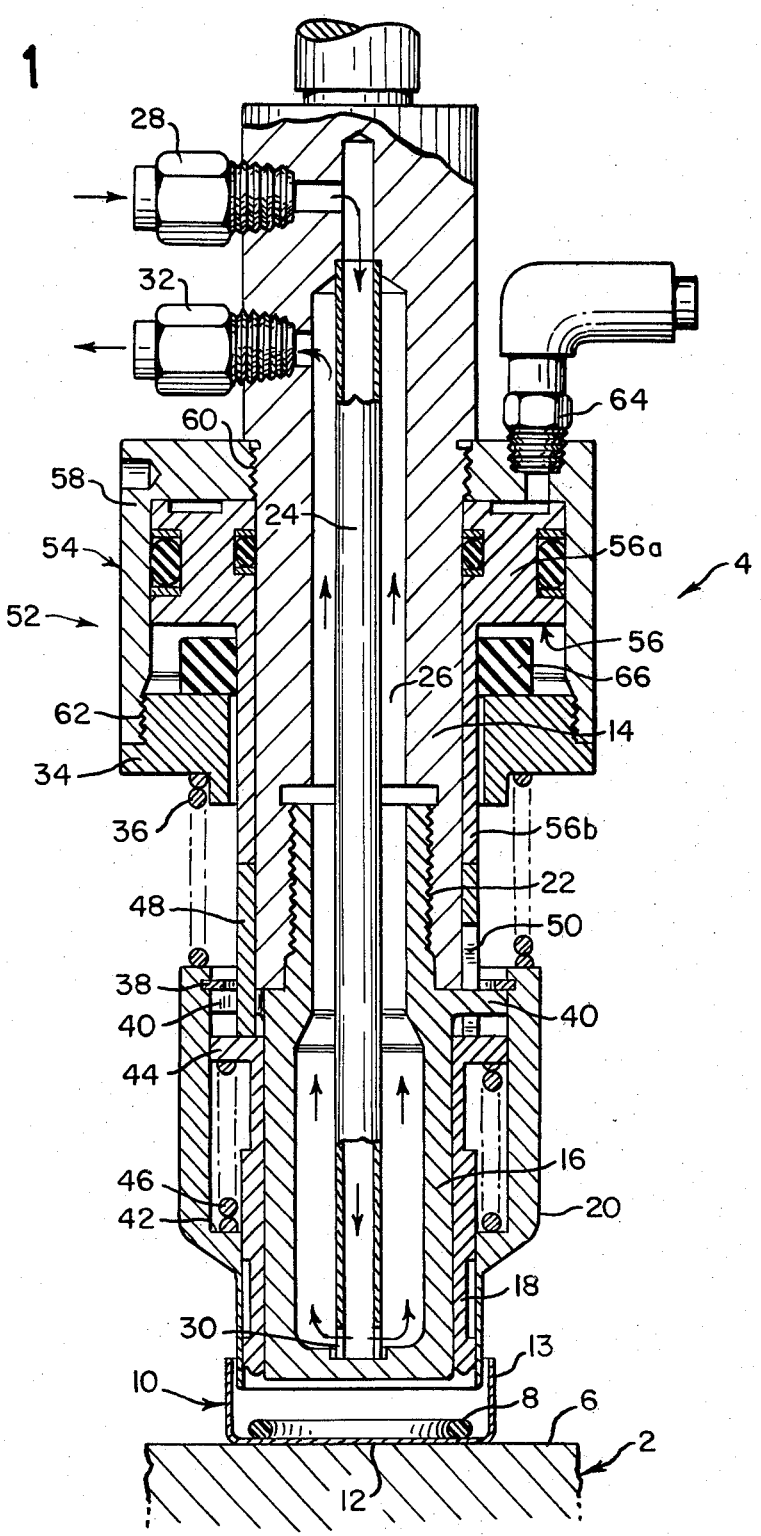
FIG. 1 is a partial sectional view of a molding device constructed in accordance with the invention.

Referring to FIG. 1, there is illustrated a molding device according to the invention having an anvil 2 and a molding tool generally shown at 4 and disposed above the anvil 2.

The anvil 2 has a substantially flat top surface 6. An inverted closure shell 10 (that is, the inside of its top panel being turned upside) having a liner material 8 supplied to the inside of the top panel is conveyed to the top surface 6 of the anvil 2 by a suitable conveyor mechanism (not shown) and set in place. The closure shell 10 may be of any suitable shape. For example, it may be fabricated from a metal plate such as an aluminum-base alloy plate, a tin plate or a chromate-treated steel sheet into such a shape that it has a circular top panel 12 and a cylindrical skirt 13 extending from the peripheral edge of the top panel 12. The liner material 8 which is to be molded and which has been supplied to the inside of the top panel 12 of the shell 10 may be of any desired shape. When the diameter of the container closure shell 10 is relatively large, it is preferred that the liner material 8 be positioned annularly on the peripheral portion of the inside of the top panel 12 by such a method as is described in the above-cited Japanese Patent Publication No. 27523/80, or the liner material 8 may be partially prefabricated in the manner described in the above-cited U.S. Pat. No. 4,327,840 so that a greater part thereof is positioned annularly on the peripheral edge portion of the inside of the top panel 12.

The molding tool 4 has a main body 14, a center punch 16, an annular bushing 18 and an annular position setting sleeve 20. The center punch 16 is fixed to the main body 14 by threads 22 contained on the lower end of the main body 14. An introduction passage 24 and a discharge passage 26 are included in the main body 14 and the center punch for circulation of a suitable cooling fluid (or heating fluid) such as water. Preferably these passages are constructed such that a cooling fluid (or heating fluid) is introduced into the introduction passage 24 through an inlet portion 28 in the direction of the arrow. The fluid will flow into the discharge passage 26 through a hole 30 provided at the lower end of the introduction passage 24, and finally will be discharged from an outlet portion 32.

The annular bushing 18 is disposed externally of the center punch 16 so that it can be raised and lowered over a predetermined range. The annular position setting sleeve 20 is disposed externally of the annular bushing 18 so that it can also be raised and lowered over a predetermined range. A spring means 36 consisting of a compression coil spring is interposed between the upper end of the annular position setting sleeve 20 and the lower surface of an annular member 34 fixed to the main body 14 so that the annular position setting sleeve 20 is resiliently urged downwardly relative to the main body 14 by the resilient action of the spring means 36. The downward movement of the sleeve 20 is restricted by a holding ring 38 fixed to the inside of the upper end portion of sleeve 20 abutting against the top surfaces of a plurality of radially projecting circumferentially spaced portions 40 formed on the upper end portion of the center punch 16. Furthermore, a spring means 46 consisting of a compression coil spring is interposed between a shoulder 42 formed on the lower inside surface of the annular position setting sleeve 20 and a flange portion 44 formed on the upper end of the annular bushing 18. The spring means 46 thus urges the annular bushing 18 upwardly relative to the annular position setting sleeve 20 and the main body 14. The upward movement of the annular bushing 18 is restricted by the abutment of the upper end of the annular bushing 18 against the lower end of a tubular member 48 which is arranged externally of the main body 14. The annular member 48 has formed therein a plurality of cuts 50 (only one of which is shown in FIG. 1) through which the radially projecting portions 40 of the center punch 16 project radially outwardly.

Figure 2:
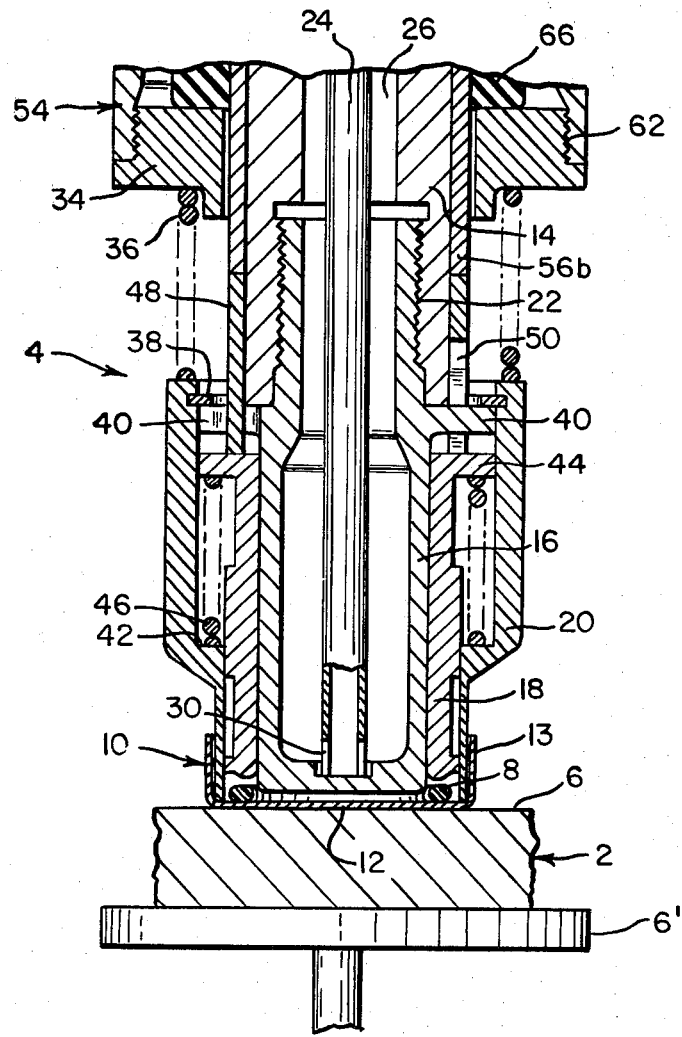
FIGS. 2 to 6 are partial sectional views similar to FIG. 1 showing the principal parts of the molding device in various stages of operation.

In addition to the anvil 2 and the molding tool 4 described above, the molding device of the invention further includes an elevator mechanism as shown in FIG. 2 of any suitable known form for raising or lowering the anvil toward and away from the main body 14. In the alternative, elevator means could be connected to the main body 14 to provide relative movement of the body and anvil towards and away from each other.

It is also important that the molding device constructed should include a mechanism for selectively lowering the annular bushing 18 as required against the force of the spring means 46. The annular bushing-lowering mechanism may comprise a hydraulic cylinder mechanism including a cylinder attached to the main body 14 of the molding tool and a piston 56 disposed for slidable movement relative to the cylinder 54. The cylinder 54 consists of an inverted cup-like member 58 secured to the main body 14 by threads 60 and to the annular member 34 by threads 62. The piston 56 has a head portion 56a slidably received within the cylinder 54 and a rod portion 56b projecting downwardly through a gap between the peripheral surface of the main body 14 of the molding tool and the inner circumferential surface of the annular member 34. The lower end of the rod portion 56b, that is, the output end of the piston 56 abuts against the upper end of the annular member 48.

An inlet 64 is provided for introducing an actuating fluid such as compressed air or a pressurized oil into the pressurized end of the cylinder 54 and more specifically, at the upper end of the inverted cup-like member 58. Preferably, an annular buffer 66 of a predetermined thickness and formed of a suitable elastic material such as a synthetic rubber is provided on the rod side of the cylinder 54 which is more specifically, on the upper surface of the annular member 34.

It will be appreciated that when an actuating pressurized fluid is introduced into the cylinder 54 through the inlet port 64 of the lowering mechanism 52, the piston 56 is lowered to cause the output end of the piston 56, that is, the lower end of the rod portion 56b, to contact the annular bushing 18 through the annular member 48, thereby lowering the annular bushing against the force of the spring means 46.

When the lower end of the molding tool 4 is to be inserted into the container shell 10 by operating the elevator mechanism (not shown) to lower the main body 14 of the molding tool 4 or raise the anvil 2, the mechanism 52 for lowering the annular bushing 18 is in an inoperative condition as shown in FIG. 1 and the annular bushing 18 is held at its raised position with respect to the main body 14 by the force of the spring member 46. The annular position setting sleeve 20, on the other hand, is held at its lowered position with respect to the main body 14 by the force of the spring means 36. It is important that in such a state, the lower end of the annular bushing 18 should be positioned above the lower end of the center punch 16 and above the lower end of the annular position setting sleeve 20. Preferably, the lower end of the sleeve 20 is positioned slightly below the lower end of the center punch 16.

Referring to FIG. 2, when the elevator mechanism 6' is actuated to move the main body 14 and tool 4 relatively towards the anvil 2, the lower end of the sleeve 20 will initially abut against the inside surface of the top panel 12 at a position close to, or in contact with, the periphery of the annular liner material 8 positioned at the peripheral edge of the inside of the top panel 12. At the same time, as is known to those skilled in the art, the sleeve 20 will also center the closure shell 10 on the anvil 2 if it is not accurately positioned with respect to the molding tool 4.

Figure 3:
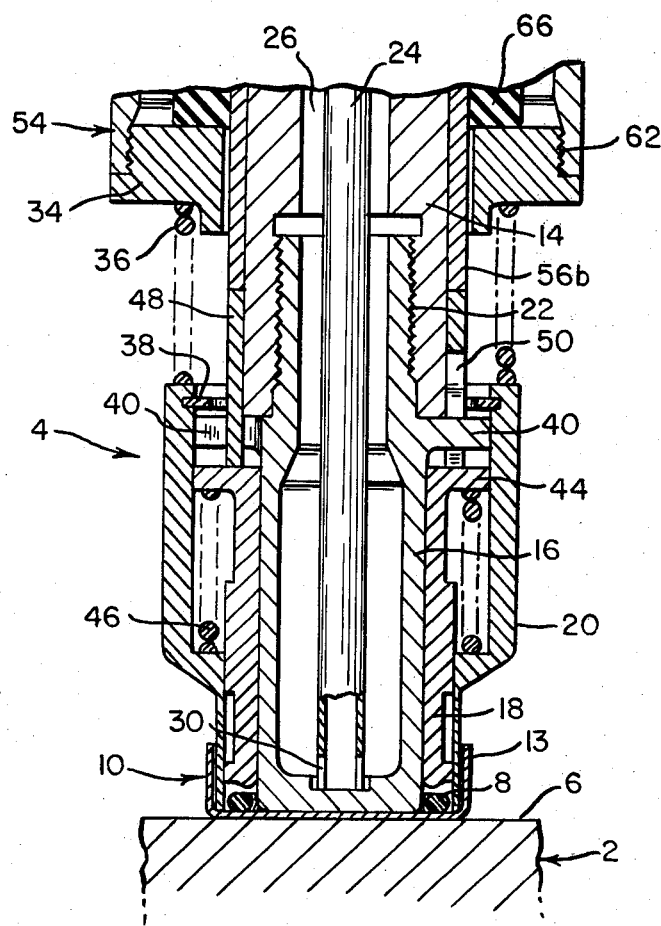

Referring to FIG. 3, further relative movement of the main body and molding tool towards the anvil will bring the lower end of the center punch 16 into contact with the inside surface of the top panel 12 of the shell 10. In those cases where the liner material 8 is present also in a central portion of the top panel 12 opposite to the lower end of the center punch 16, the lower end of the center punch 16 also contacts this part of the liner material 8 and spreads it. At this point, the relative movement of the main body 14 and the molding tool 4 towards the anvil ceases. Further, at this point, as shown in FIG. 3, the annular position setting sleeve 20 is raised relative to the main body 14 of the molding tool 4 against the force of the spring means 36. After the parts have reached the position shown in FIG. 3, the lowering mechanism 52 is then actuated.

Figure 4:
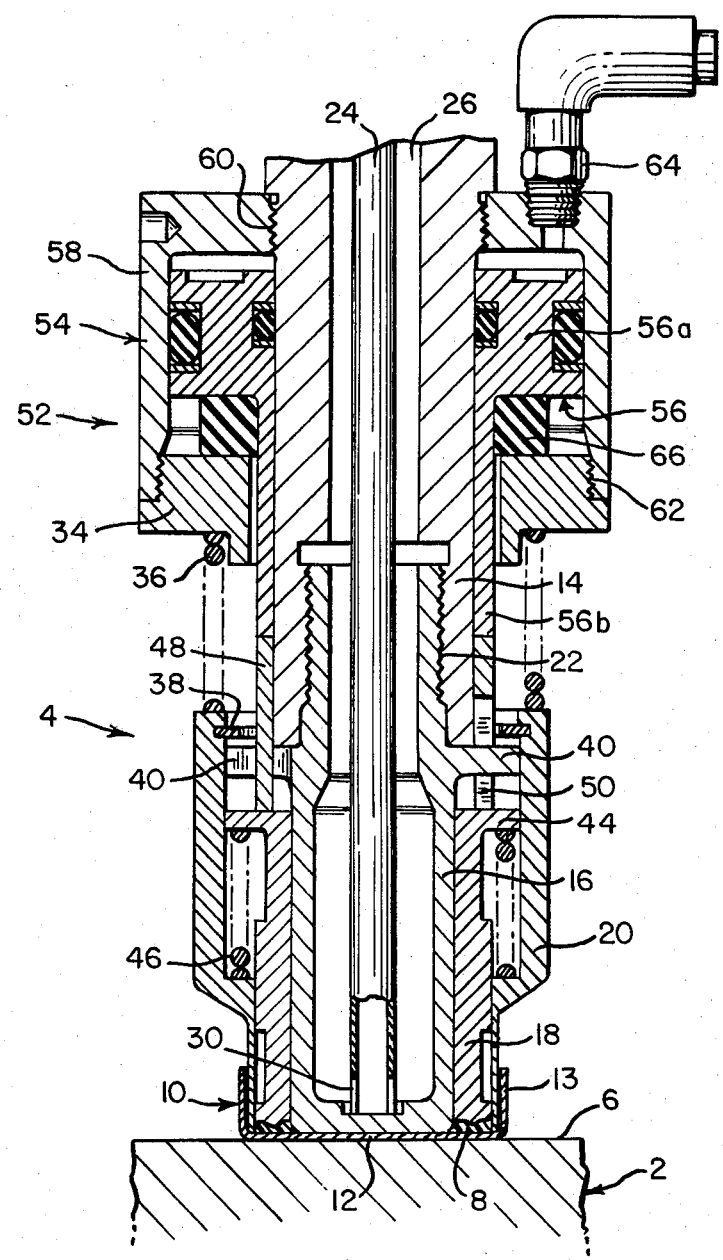

Referring to FIG. 4, when an actuating pressurized fluid is introduced into the cylinder 54 through the inlet port 64, the piston 56 is caused to descent. Hence, the annular bushing 18 is caused to descend and the lower end of the bushing 18 is pressed against the annular liner material 8. Accordingly, in a region between the lower end of the center punch 16 and the lower end of the sleeve 20, the liner material 8 is molded into a desired shape defined by the shape of the lower end of the annular bushing 18.

As stated above, when the lower end of the molding tool 4 is initially inserted into the shell 10, the annular bushing 18 is held at a raised position with respect to the main body 14, and the lower end of the annular bushing is positioned above the lower end of the center punch 16 and the lower end of the sleeve 20. The lower end of the sleeve 20 and the lower end of the center punch 16 contact the inside surface of the top panel 12 of the shell 10 outwardly and inwardly of the liner material 8 respectively thereby limiting any radially outward and inward spreading of the liner material 8 positioned therebetween. It is only after this positioning of the sleeve 20 and punch 16 that the annular bushing 18 descends to be pressed against the liner material 8. Accordingly, the liner material 8 is kept at a desired position and accurately molded into a desired shape without spreading radially outwardly and inwardly from the desired position.

After the liner material 8 has been molded as required by the procedure described hereinabove with reference to FIGS. 1 to 4, the main body 14 of the molding tool 4 is moved relative away from the anvil 2 by the elevator mechanism, thereby moving the lower end of the molding tool 4 away from the shell 10. Desirably, this operation is carried out by the following procedure.

Figure 5:
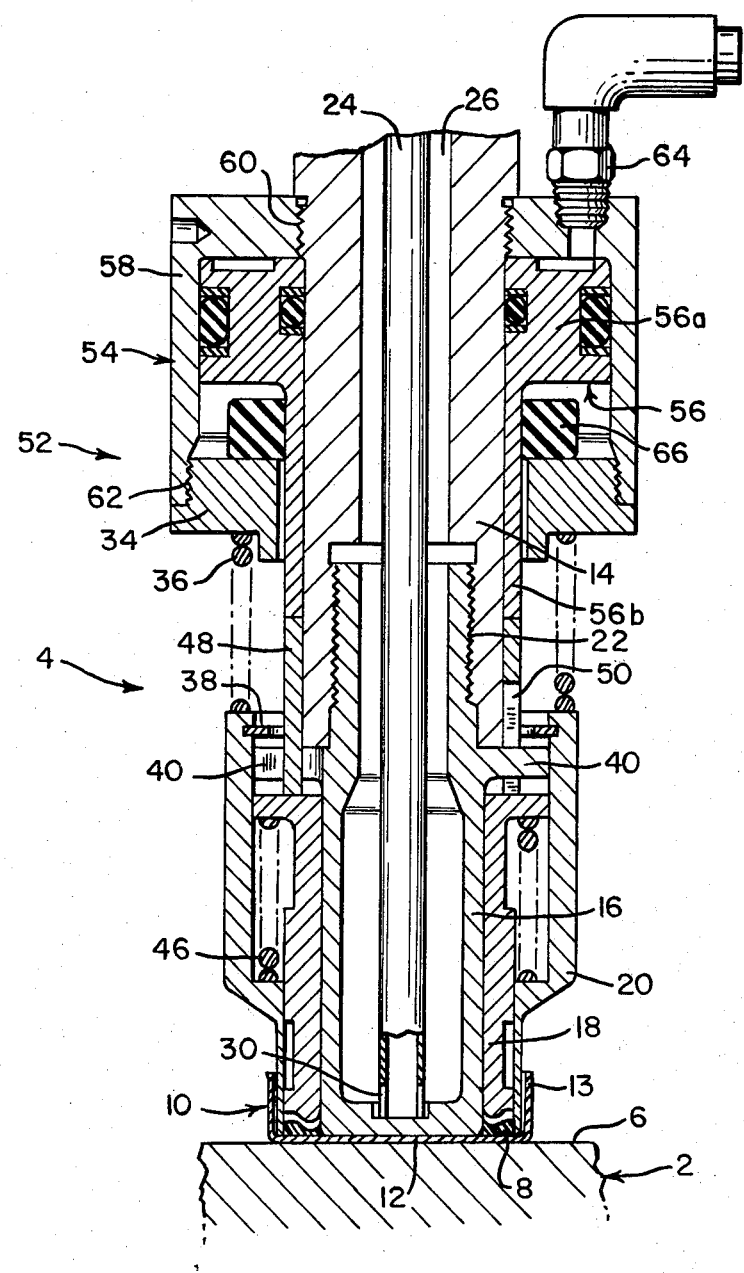

Referring to FIG. 5, prior to relative movement of the main body 14 of the molding tool 4 away from the anvil 2, the inlet port 64 is opened to atmospheric air (or an oil reservoir) to render the annular bushing-lowering mechanism 52 inoperative. As a result, the force of the spring means 46 causes the piston 56 to rise and the annular bushing 18 to return to its most elevated position with respect to the main body 14. Hence, the action of the annular bushing 18 against the liner material 8 is released.

The main body 14 of the molding tool 4 is sufficiently moved away from the anvil 2 to move the lower end of the molding tool 4 completely out of contact with the inside of the shell 10. Then, the closure shell 10 is carried away from the top surface 6 of the anvil 2.

Figure 6:
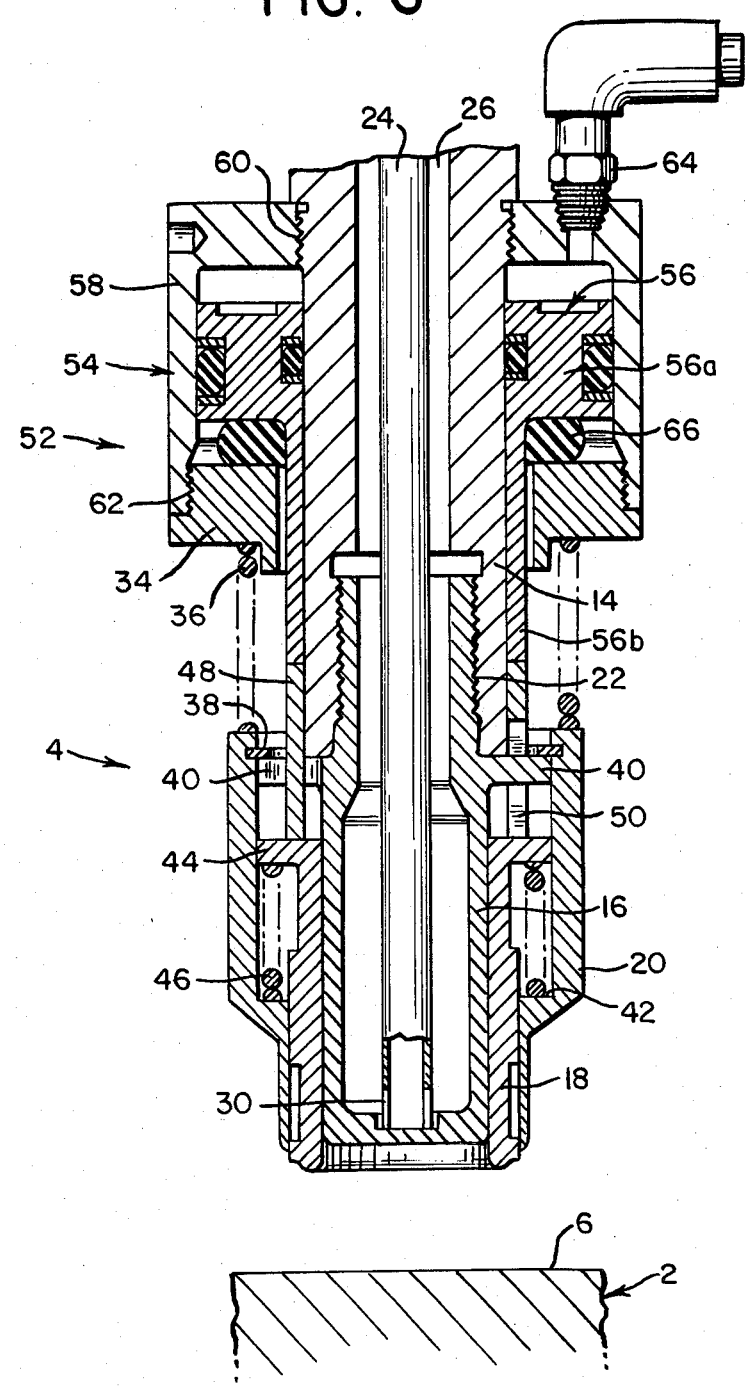

Referring to FIG. 6 an actuating pressurized fluid is then introduced into the cylinder 54 through the inlet port 64 to actuate the mechanism 52 for lowering the annular bushing 18. As a result, the piston 56, and therefore the annular bushing 18, are fully lowered to cause the lower end of the annular bushing 18 to project slightly downwardly beyond the lower end of the sleeve 20 and the lower end of the center punch 16. After this, the inlet port 64 is caused to communicate with the atmospheric air (or an oil reservoir) thereby rendering the lowering mechanism 52 inoperative. As a result, the piston 56 and the annular bushing 18 are elevated by the force of the spring means 46 and the expansion of the annular buffer 66 which has been compressed between the head portion 56a of the piston 56 and the annular member 34 to return all the parts to the position shown in FIG. 1. Thus the molding device is ready for the next cycle of molding operation.

As shown in FIG. 6, before the next cycle of molding operation is started after complete releasing of the lower end of the molding device 4 from the shell 10, the annular bushing 18 is fully lowered to cause its lower end of the sleeve 20 and the lower end of the center punch 16, and then the annular bushing 18 is elevated again. This operation brings about the following advantage.

It has been found that when the annular bushing 18 is lowered to press its lower end against the liner material 8 and mold it into the desired shape as shown in FIG. 4 and then the bushing 18 is elevated as shown in FIG. 5, a very small portion of the liner 8 tends to adhere to the inner circumferential edge and peripheral edge of the lower end of the annular bushing 18. It will be readily appreciated that if the next molding cycle is carried out while permitting a part of this liner on the end of bushing 18 to remain, it may exert adverse effects on the next molding cycle. Thus, when after completely releasing the molding tool 4 from the inside of the shell 10, the annular bushing 18 is lowered and again elevated in the above-mentioned manner to position its lower end above the lower end of the sleeve 20 and the lower end of the center punch 16, the inner circumferential edge of the lower end of the sleeve 20 and the peripheral edge of the lower end of the center punch 16 act like a knife edge against the peripheral edge and inner circumferential edge of the lower end of the annular bushing 18 respectively during the elevation of the annular bushing 18. Consequently, the remaining liner material adhering to the peripheral edge and the inner circumferential edge of the lower end of the annular bushing 18 is removed and caused to fall.

In contrast to the molding device of my invention, in the prior art molding devices, the lower end of the molding tool is initially inserted into the shell, the annular bushing is held at its lowest position with respect to the main body of the molding tool and the lower end of the annular bushing projects downwardly beyond the lower end of the center punch and the lower end of the annular position setting sleeve. For this reason, before the lower end of the sleeve and the lower end of the center punch contact the inside surface of the top panel of the closure shell, the lower end of the annular bushing tends to press against the liner material to cause it to spread radially outwardly and inwardly away from the desired position.

In the illustrated embodiment of the molding device of this invention, the molding tool 4 includes the annular position setting sleeve 20 in addition to the center punch 16 and the annular bushing 18. The sleeve 20 may be omitted when the construction of the device insures that the shell 10 is accurately placed at a predetermined position on the anvil, and the peripheral surface of the annular bushing 18 contacts the inner circumferential surface of the skirt 13 of the shell 10 very closely to prevent the liner material 8 from flowing radially outwardly and further upwardly along the inner circumferential surface of the skirt 13 of the shell 10. When it is desired to form in the inside of the top panel 12 a liner which extends to, and makes contact with, the inner circumferential surface of the skirt 13, the lower end portion of the annular position setting sleeve 20 can be made shorter than that shown in the drawings so that even in the stages shown in FIGS. 3 and 4, the lower end of the annular position setting sleeve 20 of the molding tool 4 does not contact the inside surface of the top panel 12 of the shell 10 but is located slightly above it.

While the present invention has been described in detail hereinabove with reference to one embodiment of the molding device of the invention shown in the attached drawings, it should be understood that the invention is in no way limited to such a specific embodiment, and various changes and modifications are possible without departing from the spirit and scope of the invention.

For example, in the illustrated embodiment, the spring means 46 is shown interposed between the sleeve 20 and the annular bushing 18 to resiliently urge the annular bushing 18 upwardly relative to the main body 14. In place of the spring means, it is possible to seal a space between the sleeve 20 and the annular bushing 18 (the space in which the spring means 46 is disposed in the illustrated embodiment) with a suitable seal ring and supply an actuating pressurized fluid such as compressed air to this space as required so that the bushing 18 may be urged upwardly relative to the main body 14 by the action of the actuating pressurized fluid. Alternatively, the hydraulic cylinder mechanism composed of the cylinder 54 and the piston 56 which is single-acting may be changed to a double-acting type so that the double-acting cylinder mechanism may serve both as the mechanism for lowering the annular bushing 18 as required and as the urging means for urging the annular bushing 18 upwardly relative to the main body 14. In this construction, however, it is necessary to drivingly connect the output end of the piston mechanically to the annular bushing 18 so that rising of the piston of the hydraulic cylinder mechanism induces rising of the annular bushing 18.

I claim:

1. A molding device for forming a liner on an inside surface of a top panel of a closure shell where the inside surface includes a central portion comprising an anvil adapted to support an inverted closure shell having a liner material on the inside surface, a molding tool disposed above the anvil including a main body having a lower end portion, a center punch having a lower surface fixed to the lower end portion with the lower surface of the center punch adapted to be positioned opposite to a central portion of the inside top panel surface of a shell supported on the anvil, an annular bushing positioned externally of the center punch, and an elevator mechanism for moving the main body with respect to the anvil; characterized in that the annular bushing is movable with respect to said main body, in having a first resilient means for urging the annular bushing upwardly relative to said main body, and in having a lowering mechanism for selectively lowering the annular bushing against the force of said resilient means.

2. A molding device according to claim 1 further characterized in having an annular position setting sleeve positioned externally of said bushing, said sleeve being mounted for movement with respect to said main body, and in having a second resilient means for resiliently urging said sleeve downwardly with respect to said main body.

3. A molding device according to claim 2 further characterized in that said first resilient means comprises a first spring means operatively positioned between said annular bushing and the annular position setting sleeve.

4. A molding device according to claim 2 further characterized in that said second resilient means comprises a second spring means operatively positioned between said sleeve and said main body.

5. A molding device according to claim 1 further characterized in that said lowering mechanism comprises a hydraulic cylinder mechanism including a cylinder attached to said main body and a piston slidably disposed relative to said cylinder whereby when the piston is moved downwardly, the output end of the piston acts on the annular bushing to cause it to move downwardly.

* * * * *